United States Patent
Chen

(10) Patent No.: US 10,768,487 B2
(45) Date of Patent: Sep. 8, 2020

(54) LIQUID CRYSTAL PANEL AND MANUFACTURING METHOD THEREFOR

(71) Applicants: HKC Corporation Limited, Shenzhen, Guangdong (CN); Chongqing HKC Optoelectronics Technology Corporation Limited, Chongqing (CN)

(72) Inventor: Yu-Jen Chen, Chongqing (CN)

(73) Assignees: HKC Corporation Limited, Shenzhen, Guangdong (CN); Chongqing HKC Optoelectronics Technology Corporation, Limited, Chongqing (CN)

(*) Notice: Subject to any disclaimer, the term of this patent is extended or adjusted under 35 U.S.C. 154(b) by 497 days.

(21) Appl. No.: 15/540,949

(22) PCT Filed: Feb. 26, 2017

(86) PCT No.: PCT/CN2017/074907
§ 371 (c)(1),
(2) Date: Jun. 29, 2017

(87) PCT Pub. No.: WO2018/120391
PCT Pub. Date: Jul. 5, 2018

(65) Prior Publication Data
US 2019/0391422 A1    Dec. 26, 2019

(30) Foreign Application Priority Data
Dec. 29, 2016 (CN) .......................... 2016 1 1248073

(51) Int. Cl.
*G02F 1/1339* (2006.01)
*G02F 1/1335* (2006.01)
(Continued)

(52) U.S. Cl.
CPC .......... *G02F 1/1339* (2013.01); *G02F 1/1368* (2013.01); *G02F 1/13394* (2013.01);
(Continued)

(58) Field of Classification Search
CPC .......... G02F 1/133514; G02F 1/13394; G02F 1/33512; G02F 1/1339
See application file for complete search history.

(56) References Cited

U.S. PATENT DOCUMENTS 5,680,187 A * 10/1997 Nagayama ........ G02F 1/133512
349/110
2012/0242939 A1* 9/2012 Li ...................... G02F 1/133514
349/106
2014/0293212 A1 10/2014 Osaki et al.

FOREIGN PATENT DOCUMENTS

CN    101303522 A    11/2008
CN    101344722 A    1/2009
(Continued)

OTHER PUBLICATIONS

International Search Report for PCT/CN2017/074907, dated Oct. 11, 2017.

*Primary Examiner* — James A Dudek
(74) *Attorney, Agent, or Firm* — Juan Carlos A. Marquez; Marquez IP Law Office, PLLC

(57) ABSTRACT

This application relates to a liquid crystal panel and a manufacturing method therefor, including: a first substrate, including a plurality of pixel areas, wherein the first substrate includes a first substrate body, a first insulation layer formed on the first substrate body, and a first electrode formed on the first insulation layer; a second substrate, disposed opposite to the first substrate; a plurality of photo spacers, located between the first substrate and the second substrate, and used to define a liquid crystal interval space; and a liquid crystal layer, located between the first substrate
(Continued)

and the second substrate, and filling up the liquid crystal interval space. One of the first substrate and the second substrate includes color filters. The color filters include a plurality of color filters disposed in parallel, and a material of one of the plurality of color filters is the same as a material of the photo spacer.

6 Claims, 6 Drawing Sheets

(51) Int. Cl.
    *G02F 1/1368*      (2006.01)
    *G02F 1/1362*      (2006.01)
(52) U.S. Cl.
    CPC .. *G02F 1/133512* (2013.01); *G02F 1/133516* (2013.01); *G02F 2001/13398* (2013.01); *G02F 2001/136222* (2013.01)

(56) References Cited

FOREIGN PATENT DOCUMENTS

| CN | 101676783 A | 3/2010 |
|---|---|---|
| CN | 104570502 A | 4/2015 |
| CN | 105807473 A | 7/2016 |
| JP | 06242436 A | 9/1994 |

\* cited by examiner

LIQUID CRYSTAL PANEL AND MANUFACTURING METHOD THEREFOR

BACKGROUND

Technical Field

This application relates to a manufacturing manner, and particularly to a liquid crystal panel and a manufacturing method therefor.

Related Art

With the development of technologies, liquid crystal displays (LCDs) having advantages, such as power saving, no radiation, the small volume, low power consumption, a rectangular plane, high resolution, and stable image quality, particularly, various existing information products such as: mobile phones, notebook computers, digital cameras, PDAs, and liquid crystal screens are increasingly popular, and the demand for LCDs is also greatly improved. Therefore, how to improve the efficiency of the production process and reduce steps of the process flow are problems that operators need to deal with.

However, a conventional liquid crystal panel is manufactured by using color filters (CFs) of four colors. Regardless of a general standard process such as: a CF process or a color filter on array (COA) process, a photo spacer (PS) needs to be manufactured after a red/green/blue/white/color photoresist is manufactured, and the function of the PS thereof is supporting the thickness of a liquid crystal cell. Consequently, a relatively great quantity of materials are used, management and control are difficult, the manufacturing process is complex, and equipment investments are high.

SUMMARY

To resolve the foregoing technical problems, an objective of this application lies in providing a liquid crystal panel and a manufacturing method therefor, so as to not only reduce problems of the manufacturing process, but also shorten the production time and save equipment investments.

The objective of this application and the technical problems resolved by this application are implemented by using the following technical solutions. A liquid crystal panel provided in this application comprises: a first substrate, including a plurality of pixel areas, where the first substrate further comprises a first substrate body, a first insulation layer formed on the first substrate body, and a first electrode formed on the first insulation layer; a second substrate, disposed opposite to the first substrate; a plurality of PSs, located between the first substrate and the second substrate, and used to define a liquid crystal interval space; and a liquid crystal layer, located between the first substrate and the second substrate, and filling up the liquid crystal interval space, where one of the first substrate and the second substrate comprises CFs, the CFs comprises a plurality of color filters disposed in parallel, and a material of one of the plurality of color filters is the same as material of the PSs, and the PSs are in a shape of an inverted trapezoid or resemble a shape of approximately 90°.

A method for manufacturing a liquid crystal panel comprises: providing a second substrate; forming CFs on the second substrate body, wherein a plurality of PSs are located on the second substrate body, where the CFs comprises a plurality of color filters disposed in parallel, and a material of one of the plurality of color filters is the same as a material of the PSs; forming a second electrode on the CFs; providing a first substrate disposed opposite to the second substrate, where the PSs are located between the first substrate and the second substrate, and are used to define a liquid crystal interval space, and fill up the liquid crystal interval space; and forming a liquid crystal layer between the first substrate and the second substrate. By adjusting luminance sensibility, transmittance, and chrominance of the material of the PSs, the material of a white pixel is replaced with the novel material of the PSs when the method is applied to manufacturing the CFs. Therefore, when the white pixel is manufactured, manufacturing of the PSs is completed, and a required segment gap of the PSs is made.

A method for manufacturing a liquid crystal panel comprises: providing a first substrate; forming CFs on the first substrate body, and a plurality of PSs are located on the first substrate body, where the CFs comprises a plurality of color filters disposed in parallel, and a material of one of the plurality of color filters is the same as a material of the PSs; forming a first insulation layer on the CFs; forming a first electrode layer on the first insulation layer; providing a second substrate disposed opposite to the first substrate, where the PSs are located between the first substrate and the second substrate, and are used to define a liquid crystal interval space, and fill up the liquid crystal interval space; and forming a liquid crystal layer between the first substrate and the second substrate. By adjusting luminance sensibility, transmittance, and chrominance of the material of the PSs, the material of a white pixel is replaced with the novel material of the PSs when the method is applied to manufacturing a COA. Therefore, when the white pixel is manufactured, manufacturing of the PSs is completed, and a required segment gap of the PSs is made.

This application may also further resolve the technical problems thereof by using the following technical measures.

In an embodiment of this application, the second substrate comprises: a second substrate body; CFs, located on the second substrate body; and a second electrode, located on the CFs.

In an embodiment of this application, the second substrate further comprises a light shielding layer substantially located above the PSs.

In an embodiment of this application, the second substrate further comprises an adjustment layer in contact with the PSs.

In an embodiment of this application, the first substrate further comprises: a first substrate body; CFs, located on the first substrate body; a first insulation layer, located on the CFs; and a first electrode, located on the first insulation layer.

In an embodiment of this application, the manufacturing method further comprises: by adjusting luminance sensibility, transmittance, and chrominance of the material of the PSs, replacing the material of a white pixel with the novel material of the PSs when the method is applied to manufacturing the CFs. Therefore, when the white pixel is manufactured, manufacturing of the PSs is completed, and a required segment gap of the PSs is made, where the PSs are in a shape of an inverted trapezoid or resemble a shape of approximately 90°.

In an embodiment of this application, the manufacturing method further comprises: by adjusting luminance sensibility, transmittance, and chrominance of the material of the PSs, replacing the material of a white pixel with the novel material of the PSs when the method is applied to manufacturing a COA. Therefore, when the white pixel is manufactured, manufacturing of the PSs is completed, and a required segment gap of the PSs is made, where the PSs are in a shape of an inverted trapezoid or resemble a shape of approximately 90°.

Beneficial effects of this application are that not only problems of the manufacturing process may be reduced, but also the materials may be simplified, so that the production time may be shortened and equipment investments may be saved.

DETAILED DESCRIPTION

The following embodiments are described with reference to the accompanying drawings, which are used to exemplify specific embodiments for implementation of this application. Terms about directions mentioned in this application, such as "on", "below", "front", "back", "left", "right", "in", "out", and "side surface" merely refer to directions of the accompanying drawings Therefore, the used terms about directions are used to describe and understand this application, and are not intended to limit this application.

The accompanying drawings and the description are considered to be essentially exemplary, rather than limitative. In figures, units with similar structures are represented by using the same reference number. In addition, for understanding and ease of description, the size and the thickness of each component shown in the accompanying drawings are arbitrarily shown, but this application is not limited thereto.

In the accompanying drawings, for clarity, thicknesses of a layer, a film, a panel, an area, and the like are enlarged. In the accompanying drawings, for understanding and ease of description, thicknesses of some layers and areas are enlarged. It should be understood that when a component such as a layer, a film, an area, or a substrate is described to be "on" "another component", the component may be directly on the another component, or there may be an intermediate component.

In addition, in this specification, unless otherwise explicitly described to have an opposite meaning, the word "include" is understood as including the component, but not excluding any other component. In addition, in this specification, "on" means that a component is located on or below a target component, but does not mean that the component needs to be located on top of the gravity direction.

To further describe the technical means adopted in this application to achieve the present invention objective and effects thereof, specific implementations, structures, features, and effects of a liquid crystal panel and a manufacturing method therefor provided according to this application are described in detail below with reference to the drawings and preferred embodiments.

The liquid crystal panel in this application may include a first substrate, a second substrate, and a liquid crystal layer formed between the two substrates. The first substrate and the second substrate may be, for example, a thin film transistor (TFT) substrate and a CF substrate. However, this application is not limited thereto. In an embodiment, a TFT and CFs of this application may also be formed on the same substrate.

In an embodiment, the liquid crystal panel in this application may be a curved display panel.

Figure 1A:
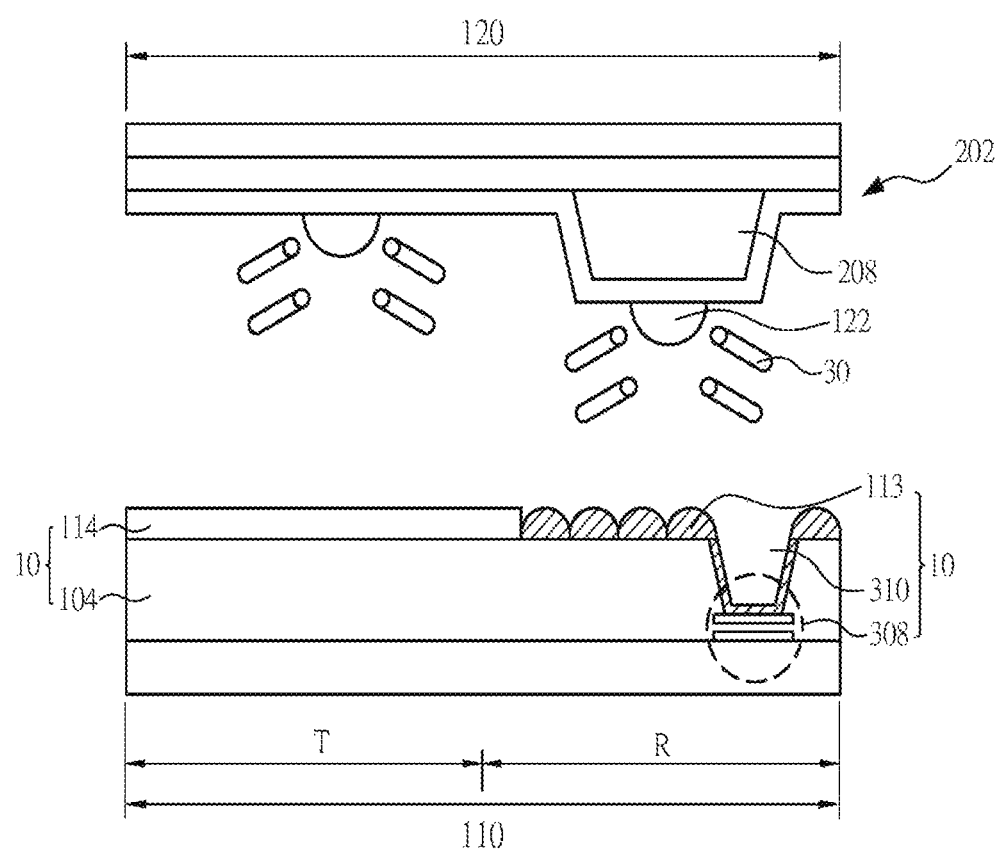
FIG. 1a is a schematic sectional diagram of an exemplary liquid crystal display panel.
Figure 1B:
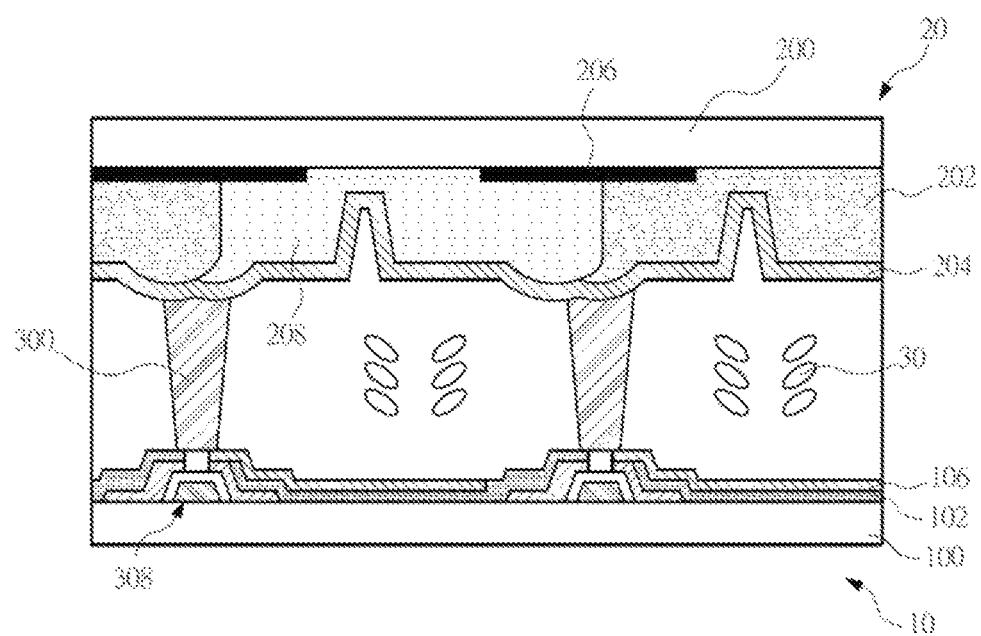
FIG. 1b is a schematic sectional diagram of manufacturing of an exemplary liquid crystal display panel.

FIG. 1a is a schematic sectional diagram of an exemplary liquid crystal display panel and FIG. 1b is a schematic sectional diagram of manufacturing of an exemplary liquid crystal display panel. Referring to FIG. 1a and FIG. 1b, in the development of the current liquid crystal display technologies, a dual gap transflective MVA liquid crystal display is used as an example. Usually, a dual gap transflective liquid crystal display is provided with an adjustment layer 208 in a reflection area R, as shown in FIG. 1a. The adjustment layer may be provided on a CF substrate side or a TFT substrate side. As shown in FIG. 1a, the basic structure of the dual gap transflective MVA liquid crystal display includes a first substrate 10, a CF substrate 202, and a liquid crystal layer 30. The first substrate 10 has a plurality of pixel areas 110. Each of the pixel areas 110 is provided with a reflection area R and a penetration area T. The CF substrate 202 also has a plurality of pixel areas 120, which respectively correspond to the plurality of pixel areas 110 of the first substrate. Moreover, each of the pixel areas 120 is provided with an adjustment layer 208 at a position corresponding to the reflection area R. The liquid crystal layer 30 is provided between the first substrate 10 and the CF substrate 202.

Continuing to refer to FIG. 1a and FIG. 1b, each of the pixel areas 110 of the first substrate 10 is provided with a TFT therein, and a storage capacitor 308 below the reflection area R. Subsequently, a flat layer 104 is formed on an upper surface of the first substrate 10. Then, a concavo-convex surface is made in the reflection area R on the flat layer 104, and then a metal having a high reflectivity (for example: aluminum and silver) is plated to serve as a reflective electrode 113. Meanwhile, the penetration area T of each of the pixel areas 110 is also provided with a transparent electrode 114. It should be noted that a contact hole 310 is further provided within the reflection area R of each of the pixel areas 110 of the first substrate 10, to be electrically connected to the reflective electrode 113 and the storage capacitor 308. In addition, the CF substrate 202 is further provided with an alignment protrusion 122 (PR for short) at a position opposite to the reflection area R and the penetration area T of the first substrate 10. Because the alignment PR 122 changes distribution of power lines, liquid crystal molecules are enabled to incline towards the direction of the alignment PR 122 to generate the effect of multi-domains, thereby achieving the technology of a wide viewing angle, and improving the problem of gray scale inversion existing in a single-domain. As shown in FIG. 1b, usually, when the first substrate 10 and the CF substrate 202 are assembled, the CF substrate 202 is further provided with a PS 300 to fix a cell gap of a panel. Moreover, a plurality of platforms corresponding to the spacer 300 is designed on a side of the first substrate 10, so that the PS 300 can maintain the cell gap of the panel more stably. Although the foregoing description uses a reflective wide-viewing-angle liquid crystal display panel as an example, the application scope of this application is not limited thereto. This application may further be applied to cases of a dual gap transflective liquid crystal display panel and a single gap transflective liquid crystal display panel.

Figure 2A:
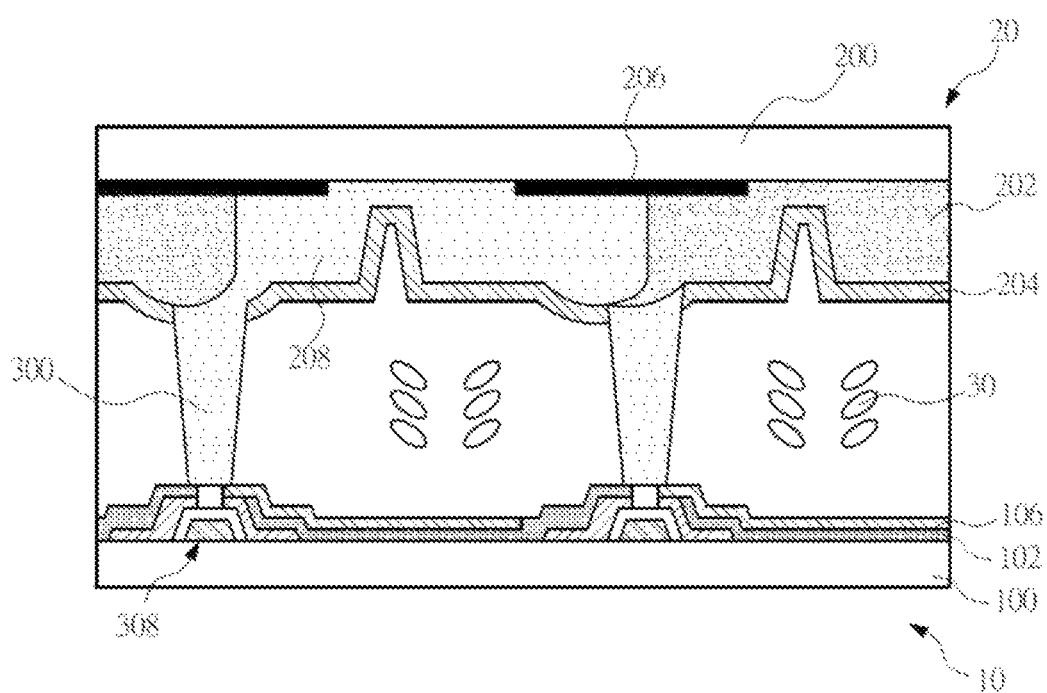
FIG. 2a is a schematic sectional diagram of manufacturing of CFs applied to a liquid crystal display panel according to a method of this application.

FIG. 2a is a schematic sectional diagram of manufacturing of CFs 202 applied to a liquid crystal display panel according to a method of this application. Referring to FIG. 2a, in an embodiment of this application, the liquid crystal panel includes: a first substrate 10 including a plurality of pixel areas, where the first substrate 10 includes a first substrate body 100, a first insulation layer 102 formed on the first substrate body 100, and a first electrode 106 formed on the first insulation layer 102; a second substrate 20 disposed opposite to the first substrate 10; a plurality of PSs 300 located between the first substrate 10 and the second substrate 20 and used to define a liquid crystal interval space; and a liquid crystal layer 30 located between the first substrate 10 and the second substrate 20 and filling up the liquid crystal interval space. One of the first substrate 10 and the second substrate 20 includes CFs 202. The CFs 202 includes a plurality of color filters disposed in parallel. The CFs 202 may have, for example, first, second, third, and fourth colors of color filters. In some embodiments, the first, second, third, and fourth colors of color filters may be, for example, red, green, blue, and white color filters, and the material of one of the first, second, third, and fourth colors of color filters is the same as that of the PSs 300. The second substrate 20 includes: a second substrate body 200; CFs 202 located on the second substrate body 200; and a second electrode 204 located on the CFs 202. The second substrate 20 further includes a light shielding layer 206 (for example, a black matrix, BM) substantially located above the PSs 300. The second substrate 20 further includes an adjustment layer 208 in contact with the PSs 300.

In some embodiments, the material of the PSs 300 may be the same as that of the white photoresist layer of the CFs 202.

In some embodiments, the plurality of color filters of the CFs 202 may also include, for example, a photoresist layer in yellow or other colors.

Figure 2B:
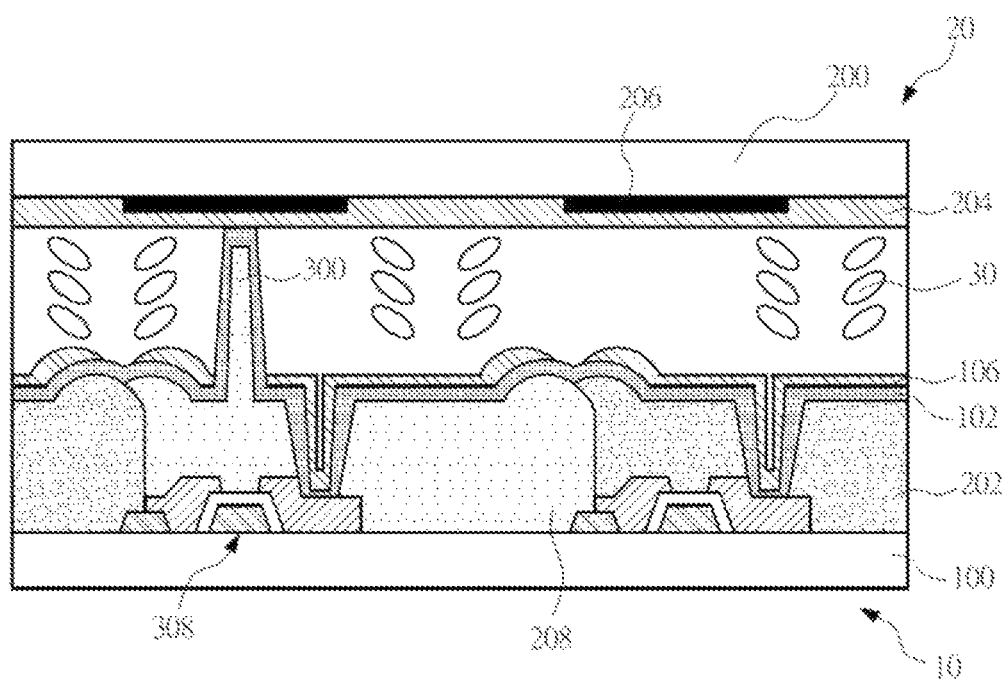
FIG. 2b is a schematic sectional diagram of manufacturing of a COA applied to a liquid crystal display panel according to a method of this application.

FIG. 2b is a schematic sectional diagram of manufacturing of a COA applied to a liquid crystal display panel according to a method of this application. Referring to FIG. 2b, in an embodiment of this application, a liquid crystal panel includes: a first substrate 10 including a plurality of pixel areas, where the first substrate 10 includes a first substrate body 100, a CF 202, a first insulation layer 102 formed on the CFs 202, and a first electrode 106 formed on the first insulation layer 102; a second substrate 20 disposed opposite to the first substrate 10; and a liquid crystal layer 30 located between the first substrate 10 and the second substrate 20. The second substrate 20 further includes a light shielding layer 206 (for example, a BM).

Figure 3:
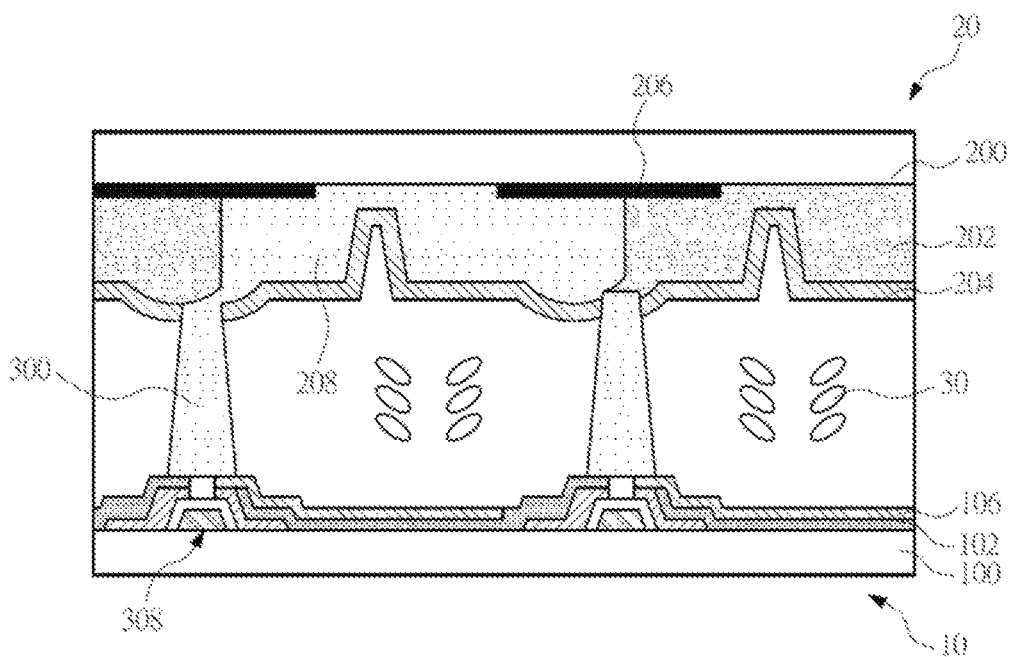
FIG. 3 is a schematic sectional diagram of manufacturing of CFs applied to a liquid crystal display panel in another embodiment according to a method of this application.

FIG. 3 is a schematic sectional diagram of manufacturing of CFs applied to a liquid crystal display panel in another embodiment according to a method of this application. Referring to FIG. 3, in an embodiment of this application, a liquid crystal panel includes: a first substrate 10 including a plurality of pixel areas, where the first substrate 10 includes a first substrate body 100, a first insulation layer 102 formed on the first substrate body 100, and a first electrode 106 formed on the first insulation layer 102; a second substrate 20 disposed opposite to the first substrate 10; a plurality of PSs 300 located between the first substrate 10 and the second substrate 20 and used to define a liquid crystal interval space; and a liquid crystal layer 30 located between the first substrate 10 and the second substrate 20 and filling up the liquid crystal interval space. One of the first substrate 10 and the second substrate 20 includes CFs 202, where the CFs 202 includes a plurality of color filters disposed in parallel. The CFs 202 may have, for example, first, second, third, and fourth colors of color filters. In some embodiments, the first, second, third, and fourth colors of color filters may be, for example, red, green, blue, and white color filters, and the material of one of the first, second, third, and fourth colors of color filters is the same as that of the PSs 300. The second substrate 20 includes: a second substrate body 200; CFs 202 located on the second substrate body 200; and a second electrode 204 located on the CFs 202. The second substrate 20 further includes a light shielding layer 206 (for example, a BM) substantially located above the PSs 300. The second substrate 20 further includes an adjustment layer 208 in contact with the PSs 300. By adjusting the developing process and photosensitive characteristics of the material of the PSs 300, the completed PSs 300 is enabled to be in a shape of an inverted trapezoid (having undercutting) or resemble a shape of approximately 90°, so that indium tin oxide (ITO) is discontinuous and is naturally interrupted at a position of the PSs 300. In this way, a CF ITO mask process does not need to be further performed. As a result, the manufacturing time is short, and investments for a yellow-light device are low.

Figure 4:
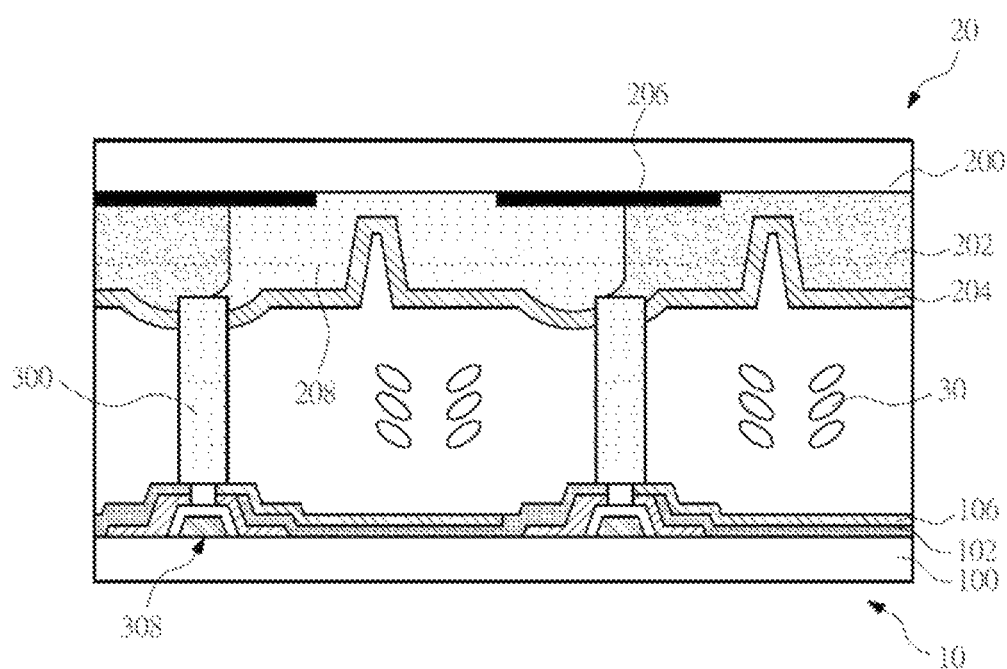
FIG. 4 is a schematic sectional diagram of manufacturing of CFs applied to a liquid crystal display panel in still another embodiment according to a method of this application.

FIG. 4 is a schematic sectional diagram of manufacturing of CFs applied to a liquid crystal display panel in still another embodiment according to a method of this application. Referring to FIG. 4, in an embodiment of this application, a liquid crystal panel includes: a first substrate 10 including a plurality of pixel areas, where the first substrate 10 includes a first substrate body 100, a first insulation layer 102 formed on the first substrate body 100, and a first electrode 106 formed on the first insulation layer 102; a second substrate 20 disposed opposite to the first substrate 10; a plurality of PSs 300 located between the first substrate 10 and the second substrate 20 and used to define a liquid crystal interval space; and a liquid crystal layer 30 located between the first substrate 10 and the second substrate 20 and filling up the liquid crystal interval space. One of the first substrate 10 and the second substrate 20 includes CFs 202. The CFs 202 includes a plurality of color filters disposed in parallel. The CFs 202 may have, for example, first, second, third, and fourth colors of color filters. In some embodiments, the first, second, third, and fourth colors of color filters may be, for example, red, green, blue, and white color filters, and the material of one of the first, second, third, and fourth colors of color filters is the same as that of the PSs 300. The second substrate 20 includes: a second substrate body 200; CFs 202 located on the second substrate body 200; and a second electrode 204 located on the CFs 202. The second substrate 20 further includes a light shielding layer 206 (for example, a BM) substantially located above the PSs 300. The second substrate 20 further includes an adjustment layer 208 in contact with the PSs 300. By adjusting the developing process and photosensitive characteristics of the material of the PSs 300, the completed PSs 300 is enabled to be in a shape of an inverted trapezoid (having undercutting) or resemble a shape of approximately 90°, so that ITO is discontinuous and is naturally interrupted at a position of the PSs 300. In this way, a CF ITO mask process does not need to be further performed. As a result, the manufacturing time is short, and investments for a yellow-light device are low.

In an embodiment of this application, a method for manufacturing a liquid crystal panel in this application includes: providing a second substrate 20; and forming CFs 202 on the second substrate body 200, and a plurality of PSs 300 is on the second substrate body 200. The CFs 202 includes a plurality of color filters disposed in parallel, and the CFs 202 may have, for example, first, second, third, and fourth colors of color filters. In some embodiments, the first, second, third, and fourth colors of color filters may be, for example, red, green, blue, and white color filters and the material of one of the first, second, third, and fourth colors of color filters is the same as that of the PSs 300. The method further includes: forming a second electrode 204 on the CFs 202; providing a first substrate 10 disposed opposite to the second substrate 20, where the PSs 300 are located between the first substrate 10 and the second substrate 20, and are used to define a liquid crystal interval space, and fill up the liquid crystal interval space; and forming a liquid crystal layer 30 between the first substrate 10 and the second substrate 20. By adjusting luminance sensibility, transmittance, and chrominance of the material of the PSs 300, the material of a white pixel is replaced with the novel material of the PSs 300 when the method is applied to manufacturing the CFs 202. Therefore, when the white pixel is manufactured, manufacturing of the PSs 300 is completed, and a required segment gap of the PSs 300 is made. The advantage thereof is saving a process for the PSs 300.

In an embodiment of this application, a method for manufacturing a liquid crystal panel in this application includes: providing a first substrate 10; and forming CFs 202 on the first substrate body 100, and a plurality of PSs 300 are located on the first substrate body 100. The CFs 202 includes a plurality of color filters disposed in parallel, and the CFs 202 may have, for example, first, second, third, and fourth colors of color filters. Moreover, the material of one of the first, second, third, and fourth colors of color filters is the same as that of the PSs 300. In some embodiments, the CFs 202 may include, for example, red, green, blue, and white color filters. Subsequently, the method includes: forming a first insulation layer 102 on the CFs 202; forming a first electrode layer 106 on the first insulation layer 102; providing a second substrate 20 disposed opposite to the first substrate 10, where the PSs 300 are located between the first substrate 10 and the second substrate 20, and are used to define a liquid crystal interval space, and fill up the liquid crystal interval space; and forming a liquid crystal layer 30 between the first substrate 10 and the second substrate 20. By adjusting luminance sensibility, transmittance, and chrominance of the material of the PSs 300, the material of a white pixel is replaced with the novel material of the PSs 300 when the method is applied to manufacturing a COA. Therefore, when the white pixel is manufactured, manufacturing of the PSs 300 is completed, and a required segment gap of the PSs 300 is made. The advantage thereof is saving a process for the PSs 300.

Beneficial effects of this application are that not only problems of the manufacturing process may be reduced, but also the materials may be simplified, so that the production time may be shortened and equipment investments may be saved.

Terms such as "in some embodiments" and "in various embodiments" are repeatedly used. Usually, the terms do not refer to the same embodiment; but they may also refer to the same embodiment. Words such as "comprise", "have", "include" are synonyms, unless other meanings are indicated in the context.

The foregoing descriptions are merely preferred embodiments of this application, and are not intended to limit this application in any form. Although this application has been disclosed above through the preferred embodiments, the embodiments are not intended to limit this application. Any person skilled in the art can make some equivalent variations or modifications according to the foregoing disclosed technical content without departing from the scope of the technical solutions of this application to obtain equivalent embodiments. Any simple amendment, equivalent change or modification made to the foregoing embodiments according to the technical essence of this application without departing from the content of the technical solutions of this application shall fall within the scope of the technical solutions of this application.

What is claimed is:

1. A method for manufacturing a liquid crystal panel, comprising:
   providing a second substrate body;
   forming color filters on the second substrate body, wherein a plurality of photo spacers are located on the second substrate body, wherein the color filters comprise a plurality of color filters disposed in parallel, and a material of one of the plurality of color filters is the same as a material of the photo spacer;
   forming a second electrode on the color filters;
   providing a first substrate disposed opposite to the second substrate, wherein the photo spacers are located between the first substrate and the second substrate, and are used to define a liquid crystal interval space, and fill up the liquid crystal interval space;
   forming a liquid crystal layer between the first substrate and the second substrate; and
   adjusting luminance sensibility, transmittance, and chrominance of the material of the photo spacers such that the material of the photo spacers is the same as the material of a white pixel when forming the color filters, wherein when the white pixel is formed, formation of the photo spacers is completed, and a required segment gap of the photo spacers is made, and
   wherein by adjusting the developing process and photosensitive characteristics of the material of the photo spacers, such that indium tin oxide is formed discontinuous and naturally interrupted at a position of the photo spacers.

2. The manufacturing method according to claim 1, wherein the photo spacers are in a shape of an inverted trapezoid or resemble a shape of approximately 90°.

3. The manufacturing method according to claim 1, wherein the second substrate further comprises an adjustment layer in contact with the photo spacers.

4. The manufacturing method according to claim 1, wherein the second substrate further comprises a light shielding layer substantially located above the photo spacers.

5. A method for manufacturing a liquid crystal panel, comprising:
   providing a first substrate body;
   forming color filters on the first substrate body, and a plurality of photo spacers are located on the first substrate body, wherein the color filters comprise a plurality of color filters disposed in parallel, and a material of one of the plurality of color filters is the same as a material of the photo spacers;
   forming a first insulation layer on the color filters;
   forming a first electrode layer on the first insulation layer;
   providing a second substrate disposed opposite to the first substrate, wherein the photo spacers are located between the first substrate and the second substrate, and are used to define a liquid crystal interval space, and fill up the liquid crystal interval space;

forming a liquid crystal layer between the first substrate and the second substrate; and adjusting luminance sensibility, transmittance, and chrominance of the material of the photo spacers such that the material of the photo spacers is the same as the material of a white pixel when forming the color filters, wherein when the white pixel is formed, formation of the photo spacers is completed, and a required segment gap of the photo spacers is made, and wherein by adjusting the developing process and photosensitive characteristics of the material of the photo spacers, such that indium tin oxide is formed discontinuous and naturally interrupted at a position of the photo spacers.

6. The manufacturing method according to claim 5, wherein the photo spacers are in a shape of an inverted trapezoid or resemble a shape of approximately 90°.

* * * * *